INVENTORS
ALBERT A. BARON
FRANCIS G. NAGY

Robert H. Ware
ATTORNEY

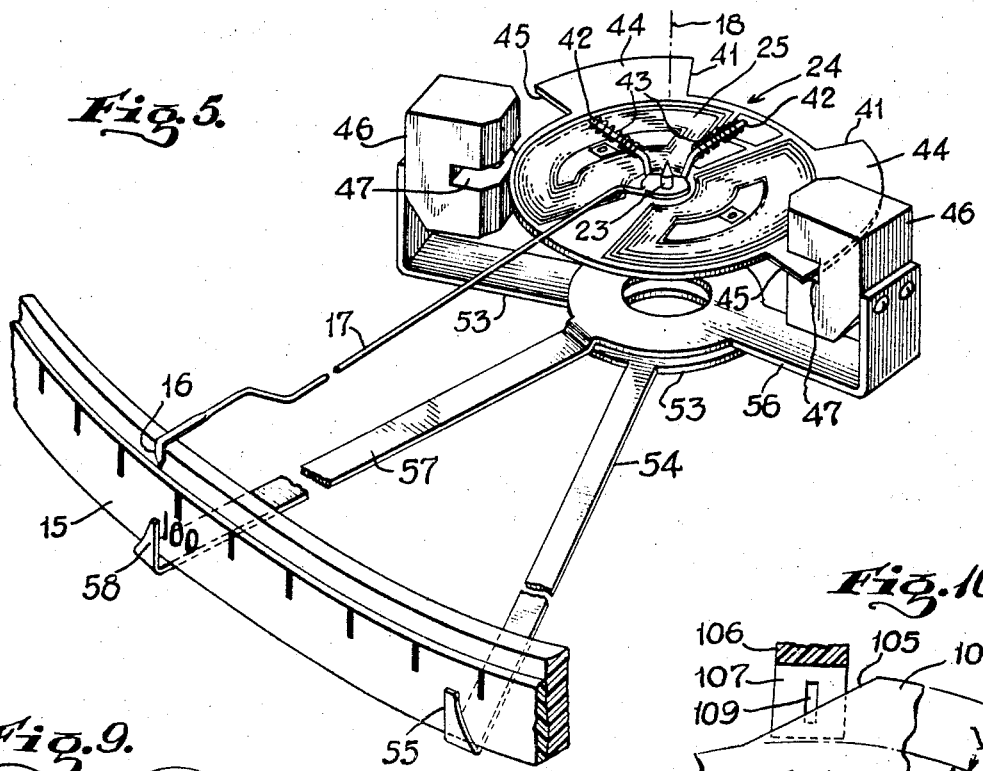
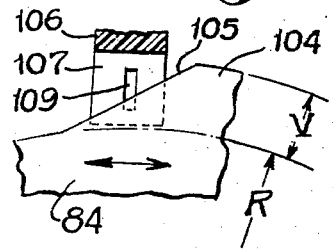
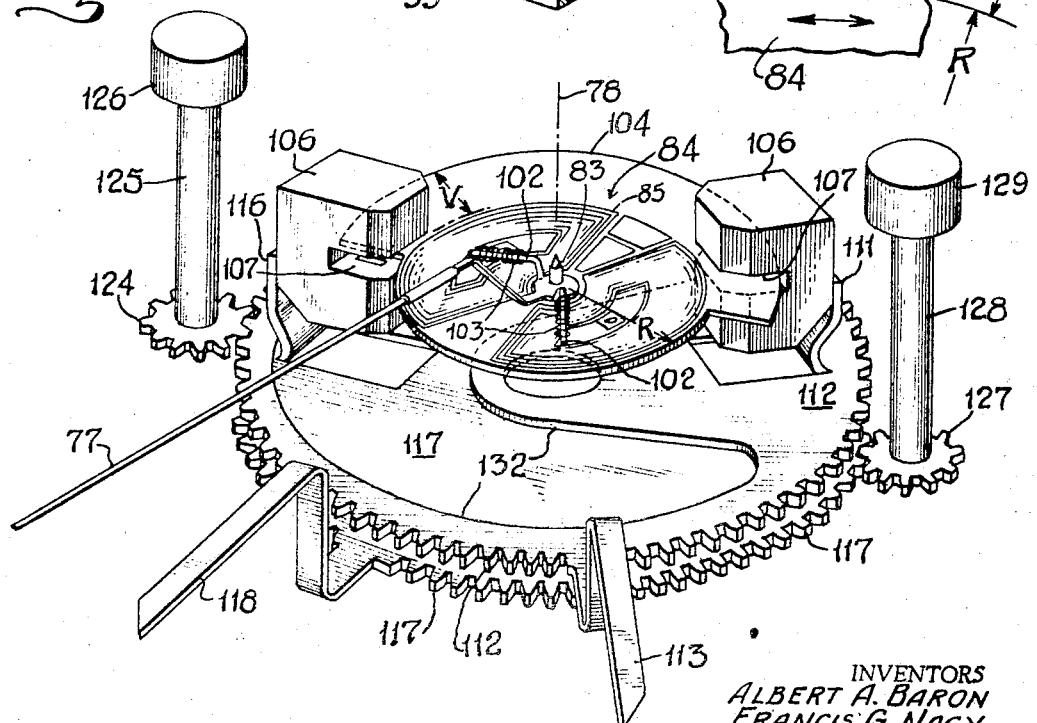

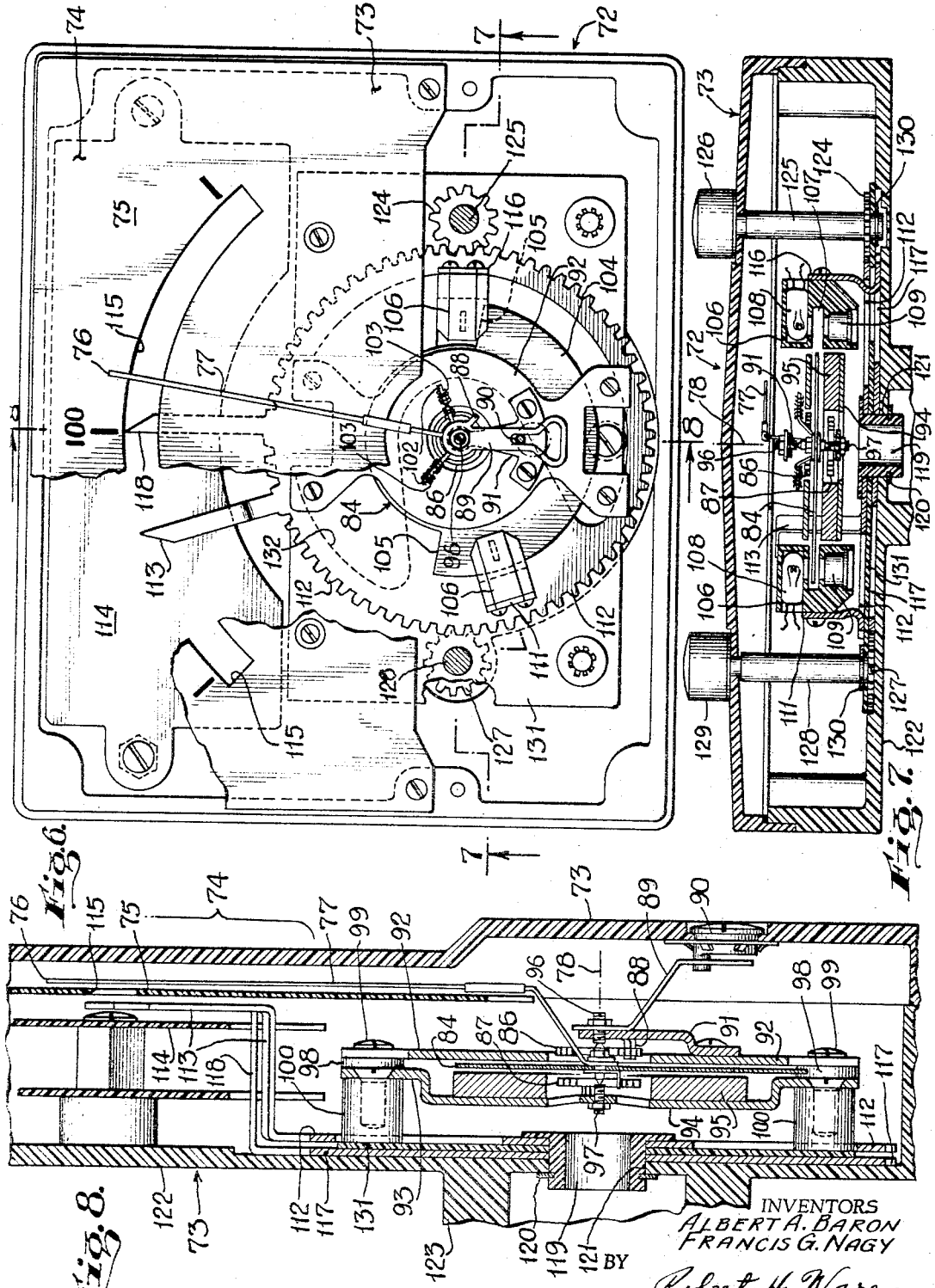

United States Patent Office 3,435,341
Patented Mar. 25, 1969

3,435,341
ELECTRICAL CONTROL METER HAVING A ROTOR DISK WITH AN ARCUATE SEGMENT FOR INTERRUPTING LIGHT BETWEEN A LIGHT SOURCE AND SENSOR
Albert A. Baron, West Redding, and Francis G. Nagy, Ridgefield, Conn., assignors to Parker Instrument Corporation, Stamford, Conn.
Filed May 6, 1965, Ser. No. 453,649
Int. Cl. G01r 1/20, 5/20, 31/00
U.S. Cl. 324—150                    11 Claims

ABSTRACT OF THE DISCLOSURE

An electrical indicating and control meter is disclosed wherein the meter movement comprises a pivotally mounted thin aluminum disk bearing a printed circuit coil on at least one insulated surface; a pair of integral coplanar arcuate segments of the disk extending radially beyond the printed circuit portion, from the periphery of the disk; and a pair of arcuately adjustable photoelectric detectors each mounted to pivot about the axis of the printed circuit disk into preselected positions whereby the radially extending arcuate segments of the disk may interrupt light to one or the other of the detectors as the motor disk rotates in response to current flowing through the printed circuit coil. A needle pointer mounted on the rotor disk and extending over a calibrated scale provides visual indication of the parameter value being metered, while a pair of manually adjustable pointers adjacent the scale face are connected to the arcuately adjustable photoelectric detectors whereby maximum and minimum control values may be selectively set.

---

This invention relates to electrical indicating instruments, and particularly to electrical control meters employing limit sensing devices capable of controlling or switching related electrical circuits in response to predetermined changes in the indication shown on the electrical meter. Specifically, the present invention is concerned with thin, rugged, lightweight electrical control meters incorporating miniature lamp-photocell sensing units which can be adjustably positioned by the user.

Various electrical indicating instruments incorporating lamps and photocells have been proposed in the past. For example, United States Patents 2,049,283, 3,010,026, 3,028,503, 3,054,928 and 3,162,789 all disclose various forms of indicating devices incorporating lamps and photocells, in which a light interrupting member moves with the indicator pointer of the instrument to obstruct light falling on a photocell. Such indicating control instruments suffer from various disadvantages, and particularly from the static and dynamic unbalancing effect upon the rotor or moving member of the meter movement created by the addition of a light-blocking interrupter or vane added to the movable member to obstruct the light falling on the photocell.

Such light interrupting vanes are sometimes mounted close to the pivoting axis of the pivotally movable member in the meter movement, to cooperate with a lamp or photocell positioned remotely away from the vane, and the limit sensing or control function of such instruments lacks sensitivity because of light beam width, parallax or "penumbra" effects, and the like.

Alternatively, prior art devices have sometimes incorporated a moving vane positioned remotely away from the pivotal axis of the moving member in the meter movement, seriously unbalancing the rotor and destroying its static and dynamic equilibrium characteristics.

The present invention is an improvement over, and takes advantage of all the desirable features and advantages of, the thin pivoting rotor disk meter movements disclosed in Louis W. Parker's United States Patents Nos. 2,773,239, 3,056,923 and 3,133,249. As described in Electronic Design News for September 1963, these Parker meters incorporate as the rotor coil of the meter movement a thin wafer or disk of metallic sheet or foil on which the entire d'Arsonval coil of the indicating meter is formed in one or more thin sheet configurations, applied by such means as printed circuit techniques to one or both faces of the disk. These thin wafer rotor disks may also incorporate laminations of oxides or plastic materials for strengthening or otherwise improving their characteristics. Such thin flat rotors provide meter movements of extreme thinness, coupled with rugged resistance to heavy physical shocks and immunity from external magnetic flux, since the thin flat rotor disk may be sandwiched between the permanent annular magnet of the instrument and a magnetic flux path-closing yoke, which thus effectively shields the meter coil from all outside magnetic influences.

In the electrical control meters of the present invention, the thin flat rotor disk of the Parker meter is modified by providing, around one or more sector portions of its peripheral rim, an integral coplanar vane sector extending radially outward to increase the overall radius of the disk over the selected sector portions of its periphery, thus providing integral radial light-interrupting vanes cooperating with miniature lamp-photocell units positioned adjacent to the rim of the rotor disk. The lamp-photocell units may be movably adjusted by the user, and the terminal edges of the light interrupting vanes may be formed in various ways during fabrication of the instruments to provide the desired light interrupting characteristic during the control and limit sensing operation of the instrument.

Other and more specific objects will be apparent from the features, elements, combinations and operating procedures disclosed in the following detailed description and shown in the drawings, in which:

FIGURE 5 is a schematic cut-away front perspective view of the movable members of the meter of FIGURE 1;

FIGURE 6 is a top plan view of another meter forming another embodiment of the present invention and having its housing cut away to disclose the meter movement;

FIGURE 7 is a sectional front end elevation view taken along the line 7—7 shown in FIGURE 6;

FIGURE 8 is a sectional side elevation view taken along the line 8—8 as shown in FIGURE 6;

FIGURE 9 is a cut away schematic top perspective view of the movable elements in the meter shown in FIGURE 6; and FIGURE 10 is a fragmentary enlarged schematic top plan view of a portion of the same meter.

EDGE-READING METER

Figures 1, 2, 3, 4:
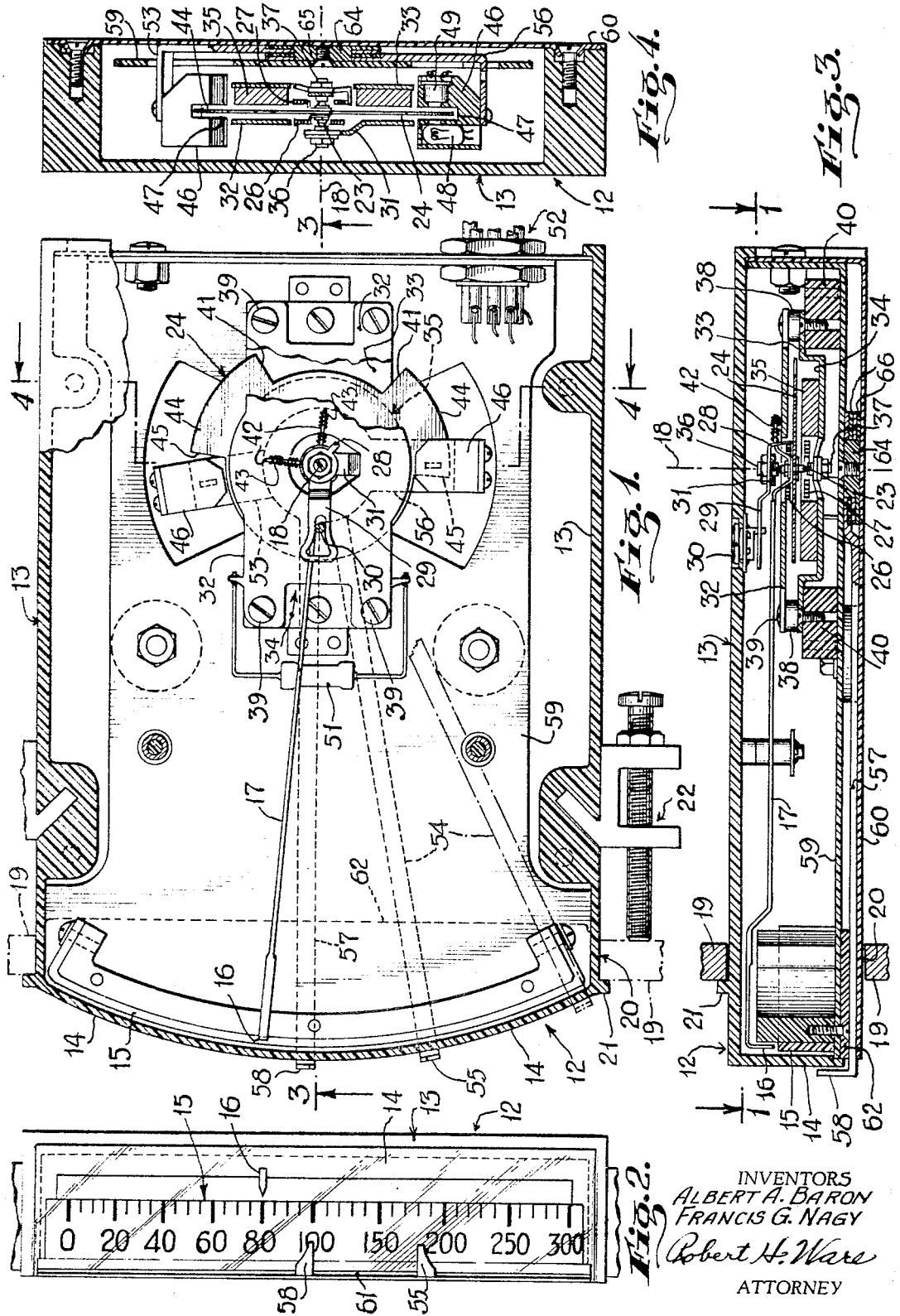
FIGURE 1 is a top plan view of an edgewise mounted electrical meter incorporating the present invention with its housing cut away to disclose the meter movement.
FIGURE 2 is a front end view of the meter of FIGURE 1.
FIGURE 3 is a sectional side elevation view of the meter of FIGURE 1 taken along the central longitudinal axis of the meter of FIGURE 1.
FIGURE 4 is a rear sectional end elevation view of the meter of FIGURE 1.

In the indicating meter 12 shown in FIGURES 1–5, the meter is enclosed in a housing 13 completely surrounding the meter movement, incorporating a transparent window portion 14 juxtaposed over a scale 15 which is thereby exposed to the user's view. The indicator tip 16 of a long, lightweight pointer 17 is juxtaposed near the scale 15. The pointer 17 may be formed of tubular aluminum, a nylon bristle, or other stiff lightweight material, and is mounted for pivotal movement about an axis 18, about which the scale 15 is arrayed concentrically, and the window 14 is positioned close to the scale 15, following a similar concentric curve as shown in FIGURE 1. The meter housing 13 is positioned behind an instrument panel 19, with window 14 protruding through a suitable aperture 20 in the panel 19. Housing 13 has an external rim flange 21 extending sideways from the window end of housing 13, which is secured against the outer face of the panel 19 by suitable clamps 22 co-operating with the flanges 21, as shown in FIGURE 1. The scale 15 and pointer tip 16 are preferably arrayed side by side in substantially the same circumferential cylindrical surface, concentric about axis 18 as shown in FIGURES 1, 2 and 3, thus minimizing parallax errors in reading the meter from angularly displaced vantage points before its window 14.

METER MOVEMENT

In addition to the pointer 17, the movable member of the meter movement in meter 12 incorporates a thin flat rotor disk 24, to which the pointer 17 is centrally anchored. The disk 24 is pivotally mounted on a short stud shaft 23, and arrayed or laminated directly on the flat surfaces of rotor disk 24 are the rotor coil windings 25, as shown in FIGURE 5, and described in the aforementioned patents of Louis W. Parker. The rotor coil windings, preferably arrayed on both surfaces of the rotor disk 24, are connected to form one continuous rotor coil, and the current to be measured is introduced to this coil through an upper hair spring 26 and through a lower hair spring 27 (FIGURES 3 and 4). The upper hair spring 26 has its inner end connected to a terminal bonding land or pad on the upper central portion of the rotor disk 24, and the spring 26 forms a concentric spiral having its outer end electrically bonded to a tab 28 protruding downwardly from an adjusting arm 29. The arm 29 has its opposite slotted end engaging an eccentric stud on an adjusting screw 30 movably secured in the upper portion of the housing 13, and the arm 29 is mounted for pivoting movement about the axis 18 and juxtaposed in electrically conducting relationship with a supporting flange 31 forming part of the upper plate 32 of the meter movement.

A generally similar lower plate 33 is formed with a dished recess 34 accommodating an annular magnet 35 which is secured therein. The short central shaft 23 has its pointed upper end journalled for pivoting movement in an end socket formed in an adjustable upper jewelled bearing 36 secured by a lock nut in the flange 31 of the upper plate 32, with the lower end of shaft 23 being socketed in a similar jewelled bearing 37 likewise adjustably positioned at the center of the recess 34 in lower plate 33.

When the disk 24 is thus positioned between the jewelled bearings 36 and 37 and assembled with magnet 35 between the plates 32 and 33 spaced apart by spacers 38 and screws 39, clamping the movement together and mounting it on mounting blocks 40, the assembled meter movement thus positions the pivoting rotor disk 24 juxtaposed to the circular magnet 35 between the two plates 32 and 33 to form a completely enclosed and unusually compact flat meter movement from which the pointer 17 protrudes toward the scale 15.

In order to balance the moving disk 24-pointer 17 portion of the meter movement, disk 24 is provided with two or three balance arms 42 joined to the upper surface of disk 24 near central pivoting axis 18 and protruding diagonally upward and then radially outward away from that axis, as illustrated in FIGURES 1 and 3. Mounted on the radial portion of each of the fine balance arms is a stiff, bent coil spring 43 and each spring 43 frictionally engages its balance arm 42 and is slidable therealong to adjust the center of gravity of the rotor assembly.

LIMIT SENSING CONTROL SYSTEM

Extending outward from the peripheral rim of the disk 24 are two vanes 44. The vanes 44 form integral, coplanar, radially extending vane sectors of disk 24, defined by a peripheral rim substantially concentric with axis 18, a leading edge 45, and a trailing edge 41. In the embodiment of the invention shown in FIGURE 1, the leading edge 45 of the upper vane 44 is angularly displaced clockwise about axis 18 approximately 90° from pointer 17, while the leading edge 45 of the lower vane 44 is angularly offset approximately 90° in a counterclockwise direction from pointer 17. Thus the two leading edges 45 are substantially opposite along a diameter of the disk 24 passing through pivotal axis 18. Each vane 44 extends peripherally from its leading edge 45 in a circumferential direction around disk 24 away from pointer 17 over an angle of approximately 52°, corresponding substantially to the angle subtended by the scale 15.

Positioned near the rim of disk 24 in the vicinity of each vane 44 is a sensing block 46 having a slot 47 radially aligned with disk 24 in registry with a vane 44, so that pivotal rotation of disk 24 moves each vane 44 toward, into and through the slot 47 in its sensing block 46. Above slot 47 in each sensing block 46, a miniature lamp 48 is installed, and a miniature photocell 49 is positioned below slot 47 in each sensing block 46 as indicated in FIGURE 4. Conductive electrical power leads from the two lamps and photocells, as well as the signal current leads conducting the current to be measured to rotor coils 25 via hair springs 26 and 27 and plates 32 and 33 of the meter movement, are all connected to a suitable socket connector 52 installed in the rear face of the housing 13, as shown in FIGURE 1. A shunt resistor 51 is connected across plates 32 and 33 in parallel with coil 25 to reduce the proportion of the measured current actually passing through coil 25.

Adjustability of the two sensing blocks 46 is provided by pivoting sensing brackets on which they are mounted. As shown in FIGURE 5, the left sensing block 46 is mounted on a left sensing bracket 53 pivotally secured within the housing beneath the meter movement and provided with a left sensing arm 54 extending toward scale 15 and having an upper control point 55 protruded from housing 30 in front of scale 15 and window 14, as shown in FIGURES 1, 2 and 5.

The right-hand sensing block 46 is similarly mounted on a right sensing bracket 56 also pivotally secured to housing 13 beneath the meter movement, and is similarly provided with a right sensing arm 57 extending toward scale 15 and having a lower control point 58 protruding from housing 13 in front of window 14 and scale 15. As shown in FIGURE 3, the sensing arms 54 and 57 extend radially from axis 18 toward scale 15 between a meter mounting plate 59 and a bottom wall 60 of the housing 13. The mounting plate 59, also shown in FIGURE 1, serves as a baffle tending to minimize the entry of dust or foreign particles into the interior of the housing 13 through the front slot 61 beneath scale 15 through which the tips of the arms 54 and 57 protrude to form control points 55 and 58. In addition, the front slot 61 is partially closed by a friction plate 62 mounted on the underside of the mounting plate 59 just outside slot 61, so that arms 53 and 57 slide pivotally between plate 62 and bottom wall 60. The friction plate 62 may be formed of "Teflon," nylon or similar low-friction plastic material to facilitate the sliding adjustment of control points 55 and 58 by the user, while serving to clamp each point while the other is moved.

As shown in FIGURES 3 and 4, a hub 64 is positioned on axis 18 at its intersection with the bottom wall 60 of the housing 13 by a screw 65, and the hub 64 constitutes a short post extending inwardly from the bottom wall 60. The central portions of the left sensing bracket 53 and the right sensing bracket 56 are provided with suitable apertures allowing them to be fitted over this hub 64, indicated in FIGURES 3, 4 and 5, thus permitting the brackets 53 and 56 to be moved pivotally about the axis 18 of hub 64 for adjustment of the photocell sensing unit secured in the sensing block 46 mounted on each sensing bracket, by means of the control points 55 and 58. Interleaved between the sensing brackets 53 and 56 above the hub 64 are one or more washers 66 of "Teflon" (polytetrafluorethylene) or similar low friction material designed to permit easy adjustment of the sensing brackets through the manual operation of the control points 55 and 58.

Thus, as shown in FIGURE 3, there are two pivoting assemblies incorporated in the instrument and adapted for angular movement about the axis 18: the lower structure, sensing brackets 53 and 56, pivoted about the hub 64 at the bottom of housing 13 for manual adjustment of the set points, held by friction in their adjusted positions, and the freely pivotally mounted rotor 24 in the meter movement, juxtaposed between the magnet 35 and the upper plate 32. Movable rotor member 17–24 of this meter movement is thus mounted for free pivoting movement about the axis 18, unimpeded by the operation of the limit sensing lamp-photocell control blocks 46 cooperating with the vanes 44. As is clearly shown in FIGURE 4, the vanes 44 move freely through slots 47 with no engagement or frictional contact of any kind.

The long life subminiature lamps 48 are aged and selected for a rated life exceeding 60,000 hours, or seven years. The photocells of the invention are subminiature cells which may be either photoconductive cells of the cadmium sulfide or cadmium selenide type for example, or photoconductive light-activated optical diodes or semiconductors, of the silicon controlled rectifier or SCR type, for example.

The cadmium sulfide photoconductive cells may be used for audio modulator-demodulator circuits, general analog and digital switching circuits or control for low powered SCR systems. The SCR photoconductive cells may be used in the meters of the present invention to provide switching, relay control or gate control for high power SCR circuits.

FRONT-READING METER

Another embodiment of the present invention is illustrated in FIGURES 6, 7, 8 and 9, showing a "front-reading," panel-mounted meter 72 having a housing 73, which may be formed of opaque plastic material incorporating a transparent window portion 74 juxtaposed over a scale 75. The tip 76 of the pointer 77 moves between the window 74 and the scale 75 across the entire width of the scale, in this case through an angle of approximately 90°, about a pivoting axis 78. The meter 72 is preferably mounted with its back facing an instrument panel and with mounting means and terminal leads being incorporated in a rearwardly protruding flange 123 projecting through a suitable aperture in the surface of the mounting panel for securing the meter thereto.

METER MOVEMENT

The meter movement in the instrument shown in FIGURE 6 is generally similar to the meter movement shown in FIGURES 1–5. A thin, flat rotor disk 84 is centrally pivoted about the axis 78 with a rotor coil 85 being carried on one or both faces of the disk 84, applied thereto, for example, by printed circuit techniques to form a single continuous d'Arsonval meter coil. Disk 84 is conductively connected to the terminal leads conveying the signal to be measured through an upper hair spring 86 and a lower spring 87 (FIGURES 7 and 8). The upper hair spring is electrically bonded to a tab 88 protruding from a zero adjusting arm 89 which is pivotally secured to the meter movement at a point spaced on the axis 78. An adjusting screw 90 rotatably secured on the face of the housing 73 for access by the user has a rear eccentric pin engaged in a slot in the zero adjusting arm 89. An arm 91 supporting the upper portion of the movable disk 84 and associated elements is mounted on the upper plate 92 of the meter movement, which is juxtaposed over a lower plate 93 provided with a recess 94 housing an annular permanent magnet 95. An upper jewel bearing 96 and lower jewel bearing 97, respectively secured by adjustable means in the arm and the lower plate 93, pivotally secure in end sockets the pointed ends of a central shaft portion 83 of the pivoting rotor disk 84, permitting its pivoting indicating movement about the axis 78. Plates 92 and 93 are suitably spaced apart by spacers 98 and secured by screws 99 to mounting blocks 100 integral with the housing 73. Balance arms 102 are secured to the upper rotor disk 84, extending diagonally upward and radially outward way from axis 78, and are provided with stiff, bent, coil balance springs 103 slidably movable therealong to adjust the center of gravity for optimum static and dynamic equilibrium of the rotor disk 84.

LIMIT SENSING CONTROL SYSTEM

The disk 84 is provided with a single, integral protruding radial vane 104 defined by a peripheral rim and two leading edges 105 extending outward from the coil portion 85 of disk 84 along radial lines substantially opposite from each other across the periphery of disk 84. Both leading edges 105 are angularly displaced by approximately 90° from the direction of the pointer 77.

Positioned opposite each other at opposite sides of the disk 84 are two sensing blocks 106 each provided with a slot 107 radially aligned with the rim of the disk 84. In each block 106 a lamp 108 and a photocell 109 flank the slot 107, and the sensing blocks 106 are positioned to permit vane 104 to approach, enter and rotate pivotally within each slot 107, interrupting the light travelling from each lamp 108 to its photocell 109 in all radial positions of the movable elements 77–84 beyond a predetermined limit position of sensing block 106.

The electrical terminal conductor leads for the signal to be indicated by the meter and for the lamps 108 and photocells 109 are all directed to and through the hub sleeve 119 shown in FIGURE 8.

The two sensing blocks 106 are mounted respectively adjacent to the edge of the rotor disk 84 with their slots 107 accommodating the vane sector 104 thereof, and the blocks 106 are mounted on upturned flanges or brackets on a pair of gears, pivotally mounted inside the bottom of the housing 73. Thus, as shown in FIGURES 7, 8 and 9, the left sensing block 106 is mounted on a left sensing bracket 111 formed as an upturned flange of a left sensing gear 112 having gear teeth formed around its periphery and provided with a left sensing arm 113 extending radially outward from the axis 78 to a point near the scale 75, where it indicates directly on the scale the limit position of pointer 77 which will actuate the photocell 109, as indicated in FIGURE 9. In FIGURE 8, the left sensing arm 113 is shown with its tip juxtaposed between the scale plate 75 and a background plate 114 underlying the scale plate 75. An aperture 115 is formed in the scale plate 75 through which the sensing arm 113 may be viewed against the background plate 114 through the transparent window portion 74 of the housing 73, all as shown in FIGURE 6.

The right sensing block 106 is similarly mounted on an upturned flange or bracket 116 extending upwardly from a right sensing gear 117 similarly mounted for pivotal movement about the axis 78 and having gear teeth formed in its periphery, with a right sensing arm 118 extending therefrom radially away from axis 78 between background plate 114 and scale plate 75 to be viewed through aperture 115 as described above, thus providing another indication of a second limit sensing position of the pointer 77.

Both of the sensing gears 112 and 117 are provided with central pivoting apertures engaging a flanged hub sleeve 119 anchored by a C-ring 120 in an aperture 121 formed in the bottom wall 122 of the housing 73. A protruding flange 123 extends outwardly from the bottom wall 122 of the housing 73, to project through a suitable aperture in a mounting panel on which the housing 73 is mounted, and any desired clamping means may be used in co-operation with flange 123 or housing 73 to secure the housing on the mounting panel.

External actuation of the upper or left sensing gear 112 to pivot it about the hub sleeve 119 concentric with axis 78 is produced by rotation of a left pinion 124 integrally secured to a left stud shaft 125 extending through a suitably aligned aperture in housing 73 and having a left control knob 126 mounted on its upper end outside the housing 73. A similar right pinion 127 engages the teeth of the sensing gear 117, and is likewise integrally mounted on a stud shaft 128 extending through the housing 73 and terminating in a right control knob 129.

Both shafts 125 and 128 are rotatably secured by such means as C-rings 130 in suitably positioned circular apertures in a mounting plate 131 which is itself secured to the bottom wall 122 of housing 73 as shown in FIGURES 6, 7 and 8.

It will be noted from a comparison of FIGURES 5 and 9 that in the edge reading instrument shown in FIGURE 5, the left hand sensing block 46 appears at the left side of the disk 24. By contrast, in the front reading instrument shown in FIGURE 9, the left sensing block appears at the right hand side of the disk 84, since FIGURE 9 is a perspective view of the instrument from its upper end for clarity of illustration. Left sensing bracket 111 may be formed by an upturned, cut-out portion of the left sensing gear 112, as shown in FIGURE 9, and the right sensing bracket 116 may similarly be formed as an upturned cutout portion of the right sensing gear 117. To permit pivoting movement of the right sensing block 106 over a substantial angle about axis 78 with its right sensing arm 118 viewable behind all portions of the scale 75, a substantial portion of the left sensing gear 112 is cut away to form a large C-shaped sector aperture 132 therein through which bracket 116 projects for free pivotal movement about the axis 78, all as shown in FIGURE 9. In order to provide a maximum relative range of angular travel for both of the sensing arms 113 and 118 across the entire scale 75, freedom of pivotal movement of gears 112 and 117 over the entire angle subtended by scale 75 is required. This angle is approximately 90° in FIGURES 5–9, and the total relative range of angular travel of the two sensing blocks is approximately 270°. Each sensing arm is free to scan the entire 90° scale, without interfering with the adjustment of the other, adjacent sensing arm. For this reason, the gear 112, closely juxtaposed to the gear 117, is cut away with a large C-shaped aperture 132 to provide maximum relative angular movement of the two gears 112 and 117 as the operator turns control knobs 126 and 129.

INTEGRAL VANE SECTORS OF ROTOR DISKS

In this instrument, the vane portion 104 of the disk 84 is an integral, peripheral semi-circular sector of the disk, and extends around half of its periphery, between two radial leading edges 105, adding an additional radial increment V to the disk. The disk has a normal radius R for the portion of its periphery underlying the pointer 77, and a larger radius corresponding to $R+V$ over this vane sector 104, as shown in FIGURE 9. The radius R is small enough to clear the light passing from each lamp 108 to its photocell 109, while the radius $R+V$ of vane sector 104 extends across and interrupts this beam of light, as indicated in FIGURE 9. By suitable positioning of the sensing blocks 106 with respect to their sensing arms, these members co-operate to indicate the limit scale positions at which the sensing units will be actuated. The sensing units may be connected either in a normally "on" or a normally "off" switching condition when pointer 77 is between the set points indicated by the sensing arms 113 and 118.

Thus in FIGURES 6–9, a normally "off" configuration is illustrated where the vane sector 104 of the disk 84 normally interrupts both photocell beams when the pointer 77 is between the sensing arms. When either light beam strikes its photocell to trigger an "on" condition, this indicates that pointer 77 has passed beyond the corresponding set point on scale 75. In FIGURE 6, the pointer 77 is shown beyond the right sensing arm 118 and the radial leading edge 105 of vane sector 104 is shown at the edge of the slot 107 in block 106 where it allows this light beam to strike the photocell 109, and the associated sensing circuit will therefore indicate that pointer 77 is beyond the predetermined limit position indicated by the right sensing arm 118.

In the instrument shown in FIGURES 1–5, a similar position of pointer 17 beyond the right sensing arm 57 has brought the leading edge 45 of vane sector 44 past the central light beam portion of the lower sensing block 46 to interrupt the light beam therein, and thus a normally "on" circuit has been turned off by the movement of pointer 17 beyond the set point indicated by the position of right sensing arm 57 and its minimum control point 58 juxtaposed with the scale 15.

As shown in FIGURE 10, vane sector 104 may be formed with a "raked" or diagonal leading edge 105 producing gradual obstruction of the light beam striking photocell 109 with increasing counterclockwise movement of disk 84. If desired, the photocell's voltage characteristic response curve may be calibrated to correspond to the precise angular position of disk 84, and a gently raked leading edge 105 approaching a spiral curve may itself subtend all or a large part of the scale angle through which disk 84 pivots, giving direct voltage indications of all angular positions of pointer 77.

ADVANTAGES OF THE INVENTION

The integral vane sectors 44 and 104 of the rotor disks 24 and 84 shown in the figures provide unusual advantages in achieving exceptionally accurate balancing of the moving portions of these meter movements for lightweight miniature electrical indicating meters. Because the vanes of these movements are formed as integral extended portions of the rotor disk itself, which normally has the radius R, to produce one or more rotor disk sectors of slightly larger radius $R+V$, the center of gravity of the rotor disk pointer assembly may be maintained very close to its pivoting axis 18 or 78, and it may be conveniently and finely adjusted by moving the balance springs on balance arms. In FIGURE 9, it will be noted that the corresponding balance arms 102 are directed generally forward, in the general direction of pointer 77 and away from the vane sector 104 to help in offsetting the mass of angular sector 104 which would otherwise tend to draw the center of gravity of this rotor disk 84 away from pointer 77.

The extremely light weight, central positioning and adjustable balancing of the centers of gravity of the rotor disks and integral vane sectors thereof provide very small response times and reliable, reproducible meter readings unaffected by the positioning and adjustment of the limit sensing systems. The limit set points are adjustable over the entire range indicated on the scale of the instrument. Automatic control systems are thus directly connected and operated without external circuitry or human intervention.

While the objects of the invention are efficiently achieved by the preferred forms of the invention described in the foregoing specification, the invention also includes changes and variations falling within and between the definitions of the following claims.

We claim:
1. An electrical control meter comprising, in combination
   (A) a housing,
   (B) a scale exposed to view through a transparent window portion of the housing and subtending a predetermined scale angle of arc about a pivoting axis passing through the housing,
   (C) and a meter movement mounted inside the housing and including a permanent magnet with
      (1) a pivotally mounted rotor disk having a conductive coil deposited thereon and an elongated pointer extending therefrom with its tip movably juxtaposable with all portions of the scale,
         (a) and at least one coplanar integral vane sector of said rotor disk protruding radially outward therefrom through an angular portion of the disk's periphery at least equal to the scale angle, and
      (2) axial mounting means pivotally supporting said rotor disk within the housing adjacent to the magnet for substantially frictionless pivoting movement about the pivoting axis,
         (a) said pivotal mounting means including electrical connections to the opposite ends of said deposited conductive coil, and
      (3) limit sensing means including a light source and a light sensor adjustably positioned adjacent the rotor disk, aligned to receive the protruding rim of the vane sector between source and sensor as the rotor disk pivots about the pivoting axis.

2. The combination defined in claim 1 wherein the integral vane sector is defined by a raked leading edge extending in the plane of the rotor disk at an angle other than normal to the periphery of the disk, whereby the light passing between said light source and light sensor is gradually interrupted as said leading edge passes therebetween.

3. The combination defined in claim 1 wherein the integral vane sector is defined by a leading edge forming part of a spiral curve.

4. The combination defined in claim 1 wherein said rotor disk is provided with a pair of radially protruding vane sectors on opposite sides of said disk with their leading edges disposed 180 degrees apart on a diameter of said disk, and the limit sensing means include two light source-light sensor units, mounted on opposite sides of said rotor disk for pivotal movement about the pivoting axis and each positioned to receive one of said vane sectors between source and sensor as the rotor disk moves about its pivoting axis.

5. The combination defined in claim 4 wherein each light source-light sensor unit is provided with a set point limit indicator viewable in juxtaposition with the scale.

6. The combination defined in claim 4 wherein separate, external, manual control means are connected to produce adjustable pivotal movement of each light source-light sensor unit.

7. The combination defined in claim 6 wherein the control means comprise an arm extending radially away from the pivoting axis toward the scale.

8. The combination defined in claim 7 wherein the control means comprise in combination a pivotally mounted gear supporting each light source-light sensor unit, and an externally actuatable pinion engaging the gear.

9. The combination defined in claim 6 including a set point limit indicator viewable in juxtaposition with the scale, angularly adjustable by the control means through an angle approximately equal to the scale angle.

10. An electrical control meter comprising, in combination
    (A) a housing,
    (B) a scale exposed to view through a transparent window portion of the housing and subtending a predetermined scale angle of arc about a pivoting axis passing through the housing,
    (C) and a meter movement mounted inside the housing and including a permanent ring magnet with
       (1) a pivotally mounted rotor disk having a radius R over a substantial part of its periphery and having a conductive coil positioned thereon and an elongated pointer extending therefrom with its tip movably juxtaposable with all portions of the scale,
       (2) axial mounting means for mounting the rotor disk in the housing adjacent to the magnet for substantially frictionless pivoting movement about the pivoting axis,
          (a) said mounting means including a pair of hair spring electrical conductors connected to the opposite ends of said conductive coil,
       (3) an integral vane sector of said rotor disk protruding radially outward a radial distance V beyond the radius R from the edge of the rotor disk between substantially radial vane edges defining an angular portion of the disk's periphery at least equal to the scale angle, and
       (4) limit sensing means including a light source and a light sensor mounted adjacent the rotor disk for pivoting angular adjustment through an angle at least equal to the scale angle and aligned to receive the protruding rim of the vane sector between source and sensor as the rotor disk pivots about the pivoting axis.

11. The combination defined in claim 10 including externally actuatable manual control means connected to produce pivotal adjustment of the limit sensing means, and set point limit indicator means connected to the limit sensing means and viewable in juxtaposition with the scale preset to indicate the scale reading of the pointer corresponding to the angular position of the rotor disk at which one of the radial vane edges is juxtaposed between the light source and the light sensor.

References Cited

UNITED STATES PATENTS

| | | | |
|---|---|---|---|
| 2,894,146 | 7/1959 | Crotty et al. | 250—231 |
| 2,974,284 | 3/1961 | Parker | 324—150 |
| 3,155,906 | 11/1964 | Roper | 324—154 |
| 3,249,759 | 5/1966 | Sendro | 250—231 |

FOREIGN PATENTS

| | | |
|---|---|---|
| 889,189 | 8/1953 | Germany. |

RUDOLPH V. ROLINEC, *Primary Examiner.*

G. R. STRECKER, *Assistant Examiner.*

U.S. Cl. X.R.

324—96